United States Patent [19]
Albert et al.

[11] Patent Number: 5,627,894
[45] Date of Patent: May 6, 1997

[54] RANDOM NUMBER GENERATOR

[75] Inventors: Bodo Albert; Klaus Vedder, both of Munich, Germany

[73] Assignee: GAO Gesellschaft fur Automation und Organisation mbH, Germany

[21] Appl. No.: 390,414

[22] Filed: Feb. 17, 1995

Related U.S. Application Data

[63] Continuation of Ser. No. 61,532, May 14, 1993, abandoned, which is a continuation of Ser. No. 674,747, Mar. 26, 1991, abandoned.

[30] Foreign Application Priority Data

Mar. 30, 1990 [DE] Germany ............... 40 10 305.6

[51] Int. Cl.⁶ .................. G06F 1/02; H03B 29/00
[52] U.S. Cl. .................. 380/46; 331/78; 364/717
[58] Field of Search ............... 380/46; 364/717; 331/78

[56] References Cited

U.S. PATENT DOCUMENTS

| | | | |
|---|---|---|---|
| 3,633,015 | 1/1972 | Lee | 364/717 |
| 3,993,872 | 11/1976 | Borbas et al. | 364/717 |
| 4,375,620 | 3/1983 | Singer et al. | 331/78 |
| 4,692,863 | 9/1987 | Moosz | 364/717 X |
| 4,974,193 | 11/1990 | Beutelspacher et al. | 395/800 |

FOREIGN PATENT DOCUMENTS

| | | | |
|---|---|---|---|
| 0023074 | 3/1980 | European Pat. Off. | H04L 9/04 |
| 0281057 | 2/1988 | European Pat. Off. | G07F 7/10 |

OTHER PUBLICATIONS

Evangelos Kranakis, *Primality and Cryptography*, (John Wiley & Sons, 1986); pp. 98–99, Section 4.1.

Dr. Larry Joel Goldstein, *IBM PC: An Introduction to the Operating System, BASIC Programming, and Applications*; (3rd Ed., 1986; Brady Books; N.Y., N.Y.; Chap. 1 and Section 7.4).

Proceedings of the Fourth Aerospace Computer Security Applications Conference, 12.–16., Dec. 1988, Orlando, FL, USA, IEEE, New York, pp. 410–412—P. Goyal, et al., "Encryption Using Random Keys. A Scheme for Secure Communications." ¶¶2, 4.3.

*Primary Examiner*—Bernarr E. Gregory
*Attorney, Agent, or Firm*—Watson Cole Stevens Davis, P.L.L.C.

[57] ABSTRACT

A method to generate a random number from certain input wherein at least parts of the input are modified by data that are independent of the generation of the random number and of the data included in the generation of the random number and a circuit configuration having a processing unit containing an encryption algorithm and a memory into which input is filed. Upon demand for a random number, the processing unit generates a random number using an encryption algorithm and input present in the memory, the current input then being changed by added data.

12 Claims, 1 Drawing Sheet

RANDOM NUMBER GENERATOR

This application is a Continuation of application Ser. No. 08/061,532, filed May 14, 1993; which is a Continuation of application Ser. No. 07/674,747, filed Mar. 26, 1991, both abandoned.

The present invention relates to a method for generating random numbers with a processing unit for determining a random number from input at each demand, and a memory in which the input is filed.

BACKGROUND OF THE INVENTION

The generation of random numbers is of substantial importance in cryptographic systems, whether for generating codes or for dynamizing encoding processes. The quality of a random number generator and thus also of the random numbers themselves is crucial for the security of the cryptographic processes. Put in simple terms, the quality of a random number generator is higher the less probable it is to predict a random number and the smaller the functional link is between the random numbers. The quality of a random number generator can be calculated by elaborate statistical methods, which shall not be dealt with here in any detail.

It has been known for some time to use a random number generator consisting of an algorithm that, starting from a start value and using a code, generates a number that has a random character in the case of high-quality algorithms. A random number generator of this type is known, for example, from U.S. Pat. No. 4,974,193 this generator being implemented in a data processing system comprising a so-called chip card and a terminal. The algorithm is provided in the processing unit (microprocessor) of the chip card, that also has the necessary storage modules. According to the proposals of EP 281 057 the start value is changed whenever a random number is generated. This variable start value can be gained from the output signal of a real-time clock module implemented in the integrated module, or from data stored in the chip. Since the start values are determined whenever random numbers are generated the time of their generation is known to an outsider. Thus making the information used as a start value fundamentally predictable, for example if the information is gained from the output signal of a clock module.

The invention is therefore based on the problem of further increasing the security requirements for the generation of random numbers compared to known methods.

This problem is solved by the features stated in the main claim.

SUMMARY OF THE INVENTION

According to an embodiment of the invention, the control unit, triggered by a trigger signal supplied to the control unit from outside, determines the instantaneous value of a counter running asynchronously to the calculation of random numbers and links this value with at least part of the input. The trigger signal supplied from outside can be triggered, for example, by any input to a keyboard that is connected with the control unit via an interface. Such keyboards are generally provided with every data processing system. Which of the diverse inputs necessary in dialogue with the system trigger the trigger signal can be defined virtually at will by accordingly programming the control unit. The input value modified in this way serves as the start value at the next demand for a random number and in the following calculation.

The processing of an unpredictable value obtained independently of the actual generation of random numbers increases the quality of the random numbers with respect to their predictability and their functional link.

BRIEF DESCRIPTION OF THE DRAWINGS

Further advantages and developments of the invention can be found in the subclaims and the subsequent description of exemplary embodiments with reference to the figures, in which:

DESCRIPTION OF THE PREFERRED EMBODIMENTS

Figure 1:
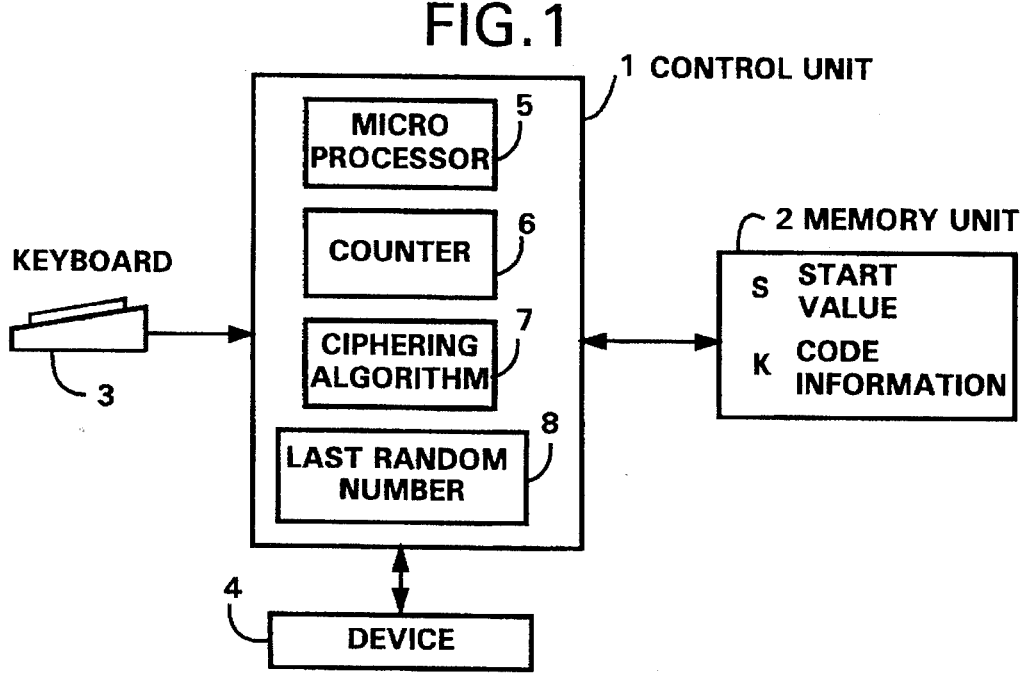
FIG. 1 shows a highly schematized block diagram for explaining the inventive method.

FIG. 1 shows in highly schematic form a circuit unit for generating random numbers by the inventive method.

In the embodiment example shown, the circuit unit comprises a control unit 1, a memory 2 and a keyboard 3 connected with the control unit. The data transfer between the control unit and peripheral devices is conducted in the known way via a bidirectional interface 4. The control unit contains a ciphering algorithm 7 that, at a corresponding demand via bidirectional interface 4, generates a random number R from a start value S and code information K that are filed in memory 2. The last random number is stored temporarily in a register 8 and can be fetched for processes in the control unit or via interface 4 for peripheral devices. The processes taking place in the control unit are controlled by a microprocessor 5. In addition to the aforesaid components the control unit also contains a counter 6. This counter can be realized as a hardware or a software counter. In each case the counter is continuously incremented independently of the control tasks of the microprocessor and thus also independently of the generation of random numbers. The counter is not resettable, nor can its particular reading at a certain time be predicted. To permit modification of at least parts of the start value or the code value in accordance with the inventive method, the instantaneous counter reading is stored temporarily at the time of an event fed to the control unit from outside and detected by the microprocessor, while the counter continues running. The temporarily stored value is then used to modify the values filed in memory 2. These processes are independent of the generation of a random number.

An event triggering modification may be a certain input to the keyboard, for example pressing of the operating key customary in these keyboards. It is also possible to use the instantaneous values of two successive keyboard inputs, possibly linked, as the value for modification. Further possibilities are conceivable that need not be specified here. What is essential is that the described procedure produces a virtually separate random number whose origin is fully detached in terms of time and of data technology from the random number then calculated and possibly reaching outside. The inventive method can therefore generate random numbers that meet very high security requirements.

In the following the method will be explained in more detail by an example with reference to FIG. 2.

In the embodiment example shown, random numbers are generated using a ciphering algorithm 7 that encodes a start value S into a random number R with the aid of a code K. The start value and code are filed at storage locations $2a$ and $2b$ in memory 2. Whenever a random number is demanded the algorithm generates a random number using current values S and K. The primary quantities for the start value and the code value are preallocated with random values. These values can be inputted either via the keyboard or via the serial interface.

Independently of the generation of random numbers the start value and code are always modified when CPU 5 registers a certain event coming from outside. Such an event causes the instantaneous counter reading of a counter 6 incremented independently of the CPU by its own clock pulse f to be transferred to a register 10 while the counter is incremented further independently thereof. If a 1-byte counter and start and code values of several bytes are used, one byte of the start or code information is replaced in each case by the value stored temporarily in register 10, or linked therewith. In the shown example the third byte of code value K and the first byte of start value S are modified. CPU 5 registers the modified byte positions so that upon a further event the next byte of the code and start information is modified. There is also the possibility of modifying several or all bytes of the start information and also the code information upon an external event. The event can also be decoded via a separate logic in the processing unit and processed accordingly.

Figure 2:
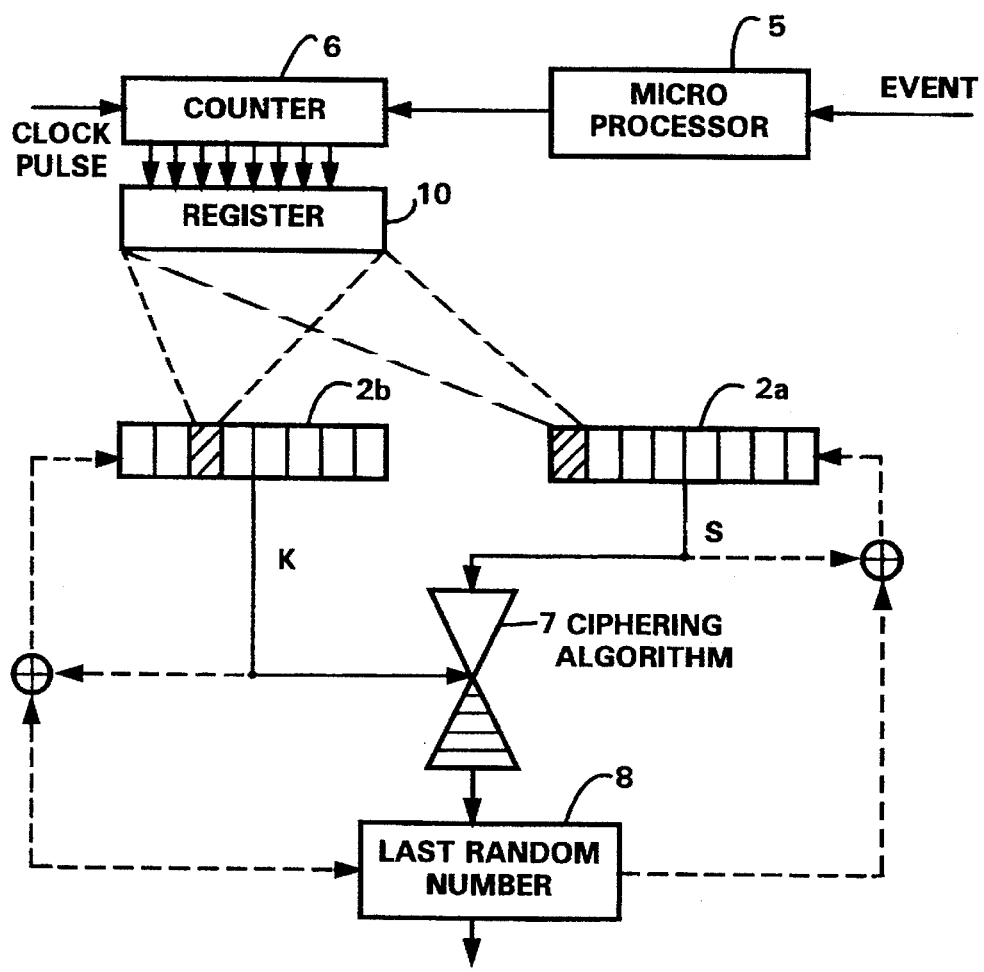
FIG. 2 shows a detailed functional diagram for generating random numbers according to an exemplary embodiment.

As indicated in FIG. 2 by broken lines, after each calculation and output of a random number this number, linked both with the code value and with the start value, for example by a modulo-2 addition, can form the new start value or code value. The linkage is in any case independent of the modification of the code and start values according to the invention.

We claim:

1. A method for generating random numbers comprising:
   a. storing input values in a first memory;
   b. in response to a request for a random number, generating said random number in accordance with (i) a ciphering algorithm and (ii) said input values;
   c. in response to a triggering signal, independent from said request for a random number, (i) generating modification data independently from said generation of said random number and (ii) modifying at least a portion of said input values stored in said first memory in accordance with said modification data.

2. The method of claim 1 including producing said modification data by taking a count of a clocked counter, said modification data in the form of a count being independent of the data used in generating the random number.

3. The method according to claim 2 including transferring said count to art intermediate second memory unit each time said triggering signal is generated and modifying said at least a portion of said input values based on data stored in said second memory unit.

4. The method according to claim 1 wherein said modification data correspond to data received from an interface connecting a processing unit including said first memory with devices external to said processing unit.

5. The method according to claim 1 wherein said triggering signal is generated by depressing a key of a keyboard connected with processing unit including said first memory.

6. The method of claim 1 wherein said step of generating said random number utilizes an encryption algorithm with input and code information of a certain length to determine said random number.

7. The method according to claim 1 wherein said step of generating said random number utilizes a ciphering algorithm and wherein said input data comprises key information and start information.

8. The method according to claim 7 wherein said input values comprise start information and key information and said method includes replacing parts of the start information by modification data each time said triggering signal is generated.

9. The method according to claim 7 wherein said input values comprise start information and key information and said method includes replacing parts of the key information by modification data each time said triggering signal is generated.

10. The method according to claim 1 wherein said triggering signal is received through an interface associated with said first memory and an external device.

11. The method of claim 10, wherein said input data are modified in accordance with said modification data cyclically and in sequence upon the occurrence of each triggering signal.

12. The method of claim 10, wherein said input data are modified in accordance with said modification data cyclically upon the occurrence of each triggering signal.

* * * * *